Aug. 28, 1956 E. F. CORNOCK ET AL 2,760,317
MACHINE FOR WRAPPING CIGARS AND THE LIKE
Filed May 10, 1950 14 Sheets-Sheet 1

INVENTORS
EDWARD F. CORNOCK AND
KENNETH F. NEWELL
BY Chapin & Neal
ATTORNEYS.

Aug. 28, 1956  E. F. CORNOCK ET AL  2,760,317
MACHINE FOR WRAPPING CIGARS AND THE LIKE
Filed May 10, 1950  14 Sheets-Sheet 2

Fig. 2.

INVENTORS
EDWARD F. CORNOCK AND
KENNETH F. NEWELL
BY Chapin & Neal
ATTORNEYS

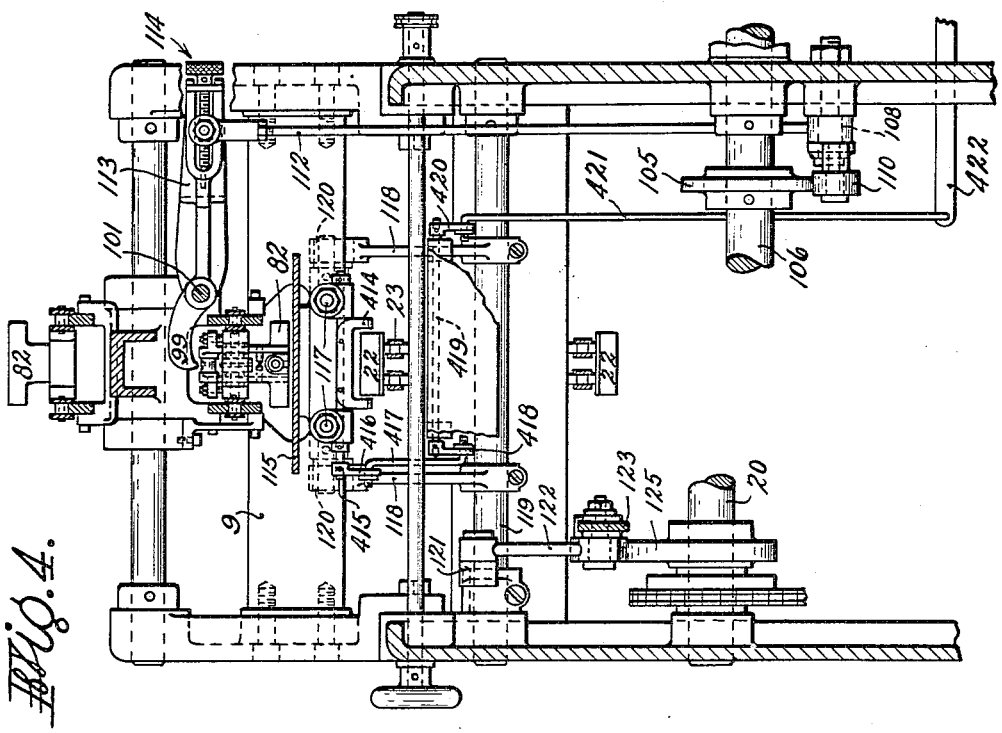

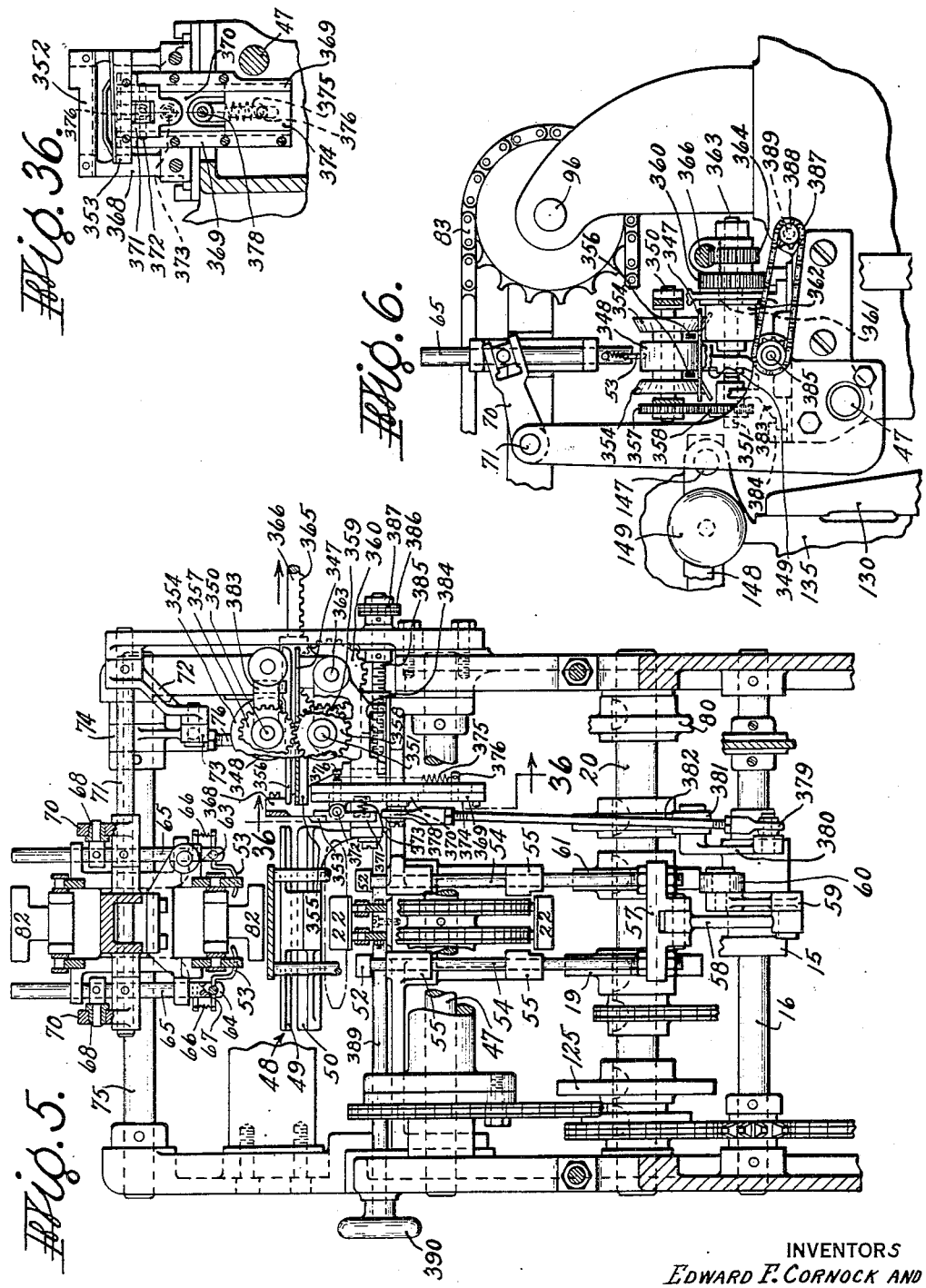

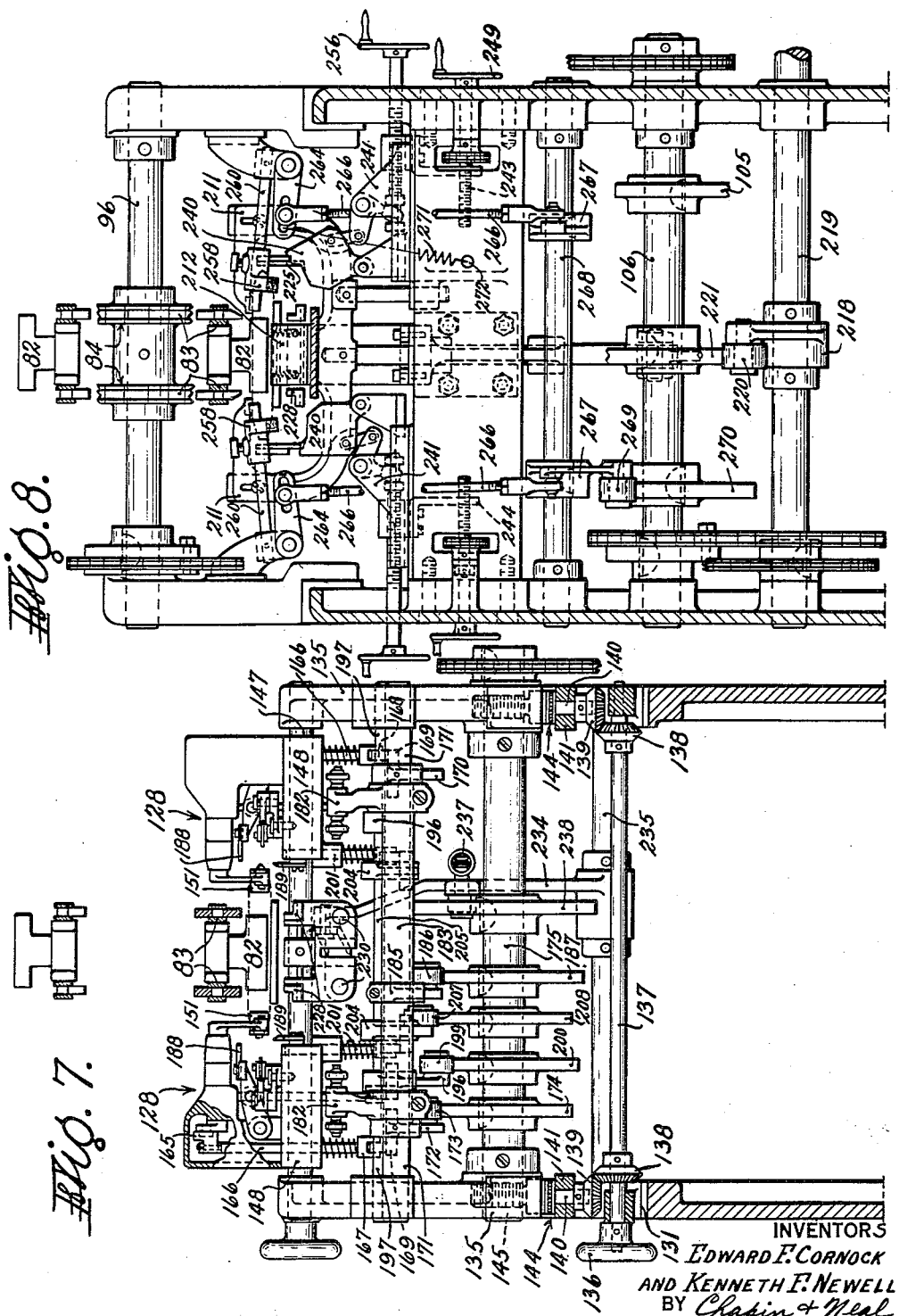

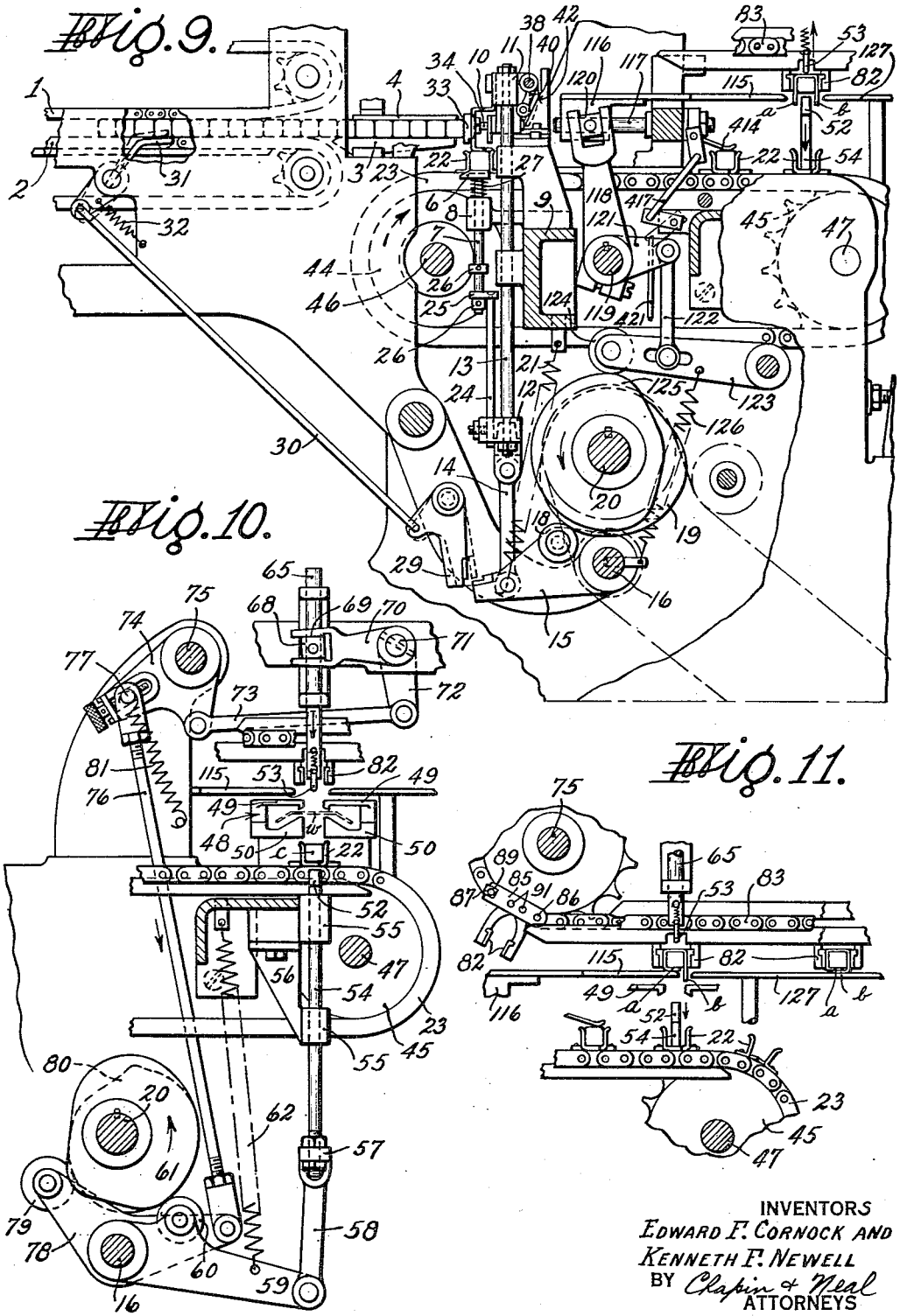

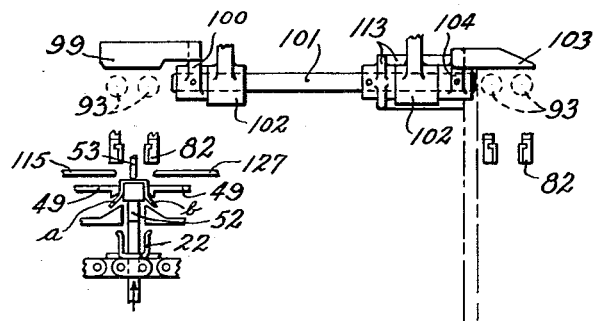
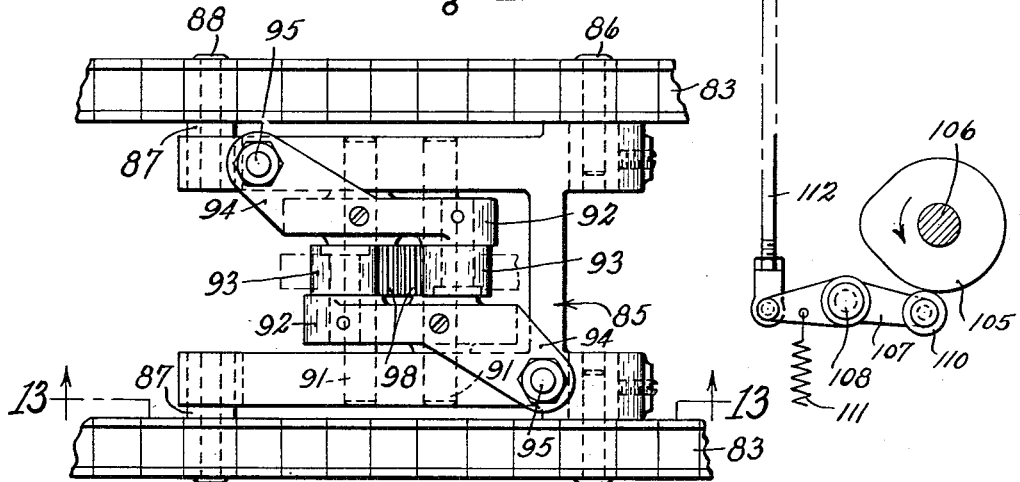
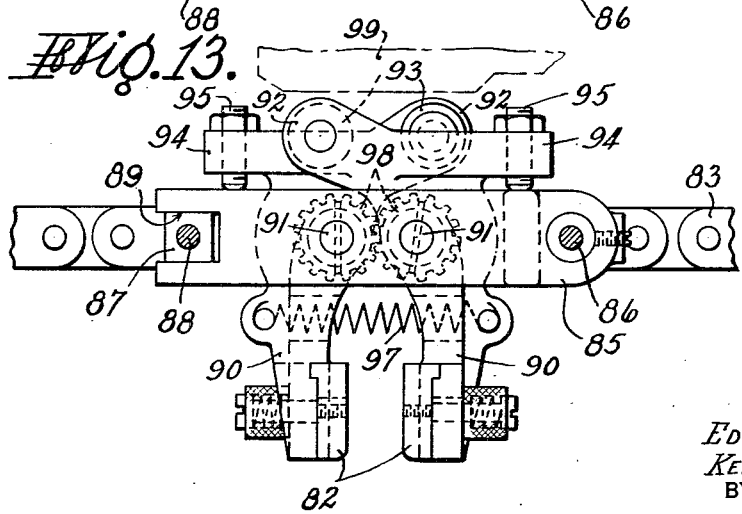

Aug. 28, 1956  E. F. CORNOCK ET AL  2,760,317
MACHINE FOR WRAPPING CIGARS AND THE LIKE
Filed May 10, 1950  14 Sheets-Sheet 8
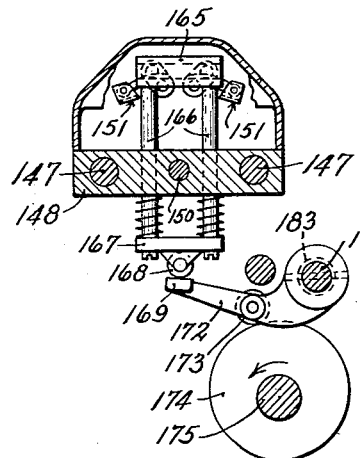
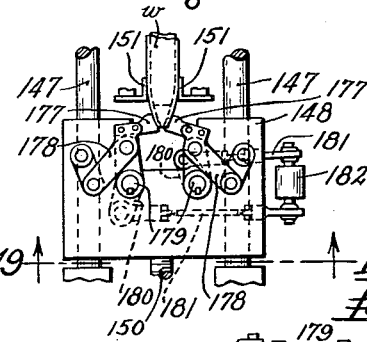
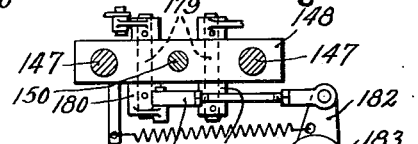
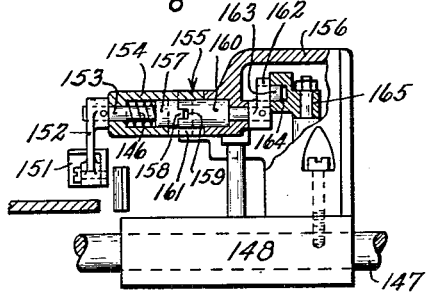
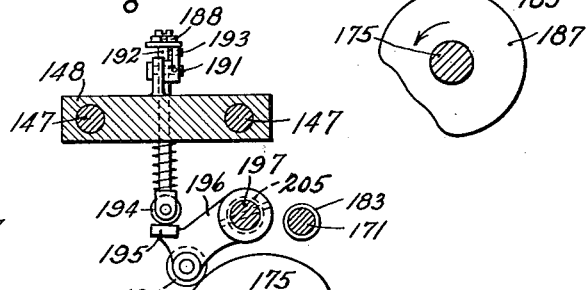
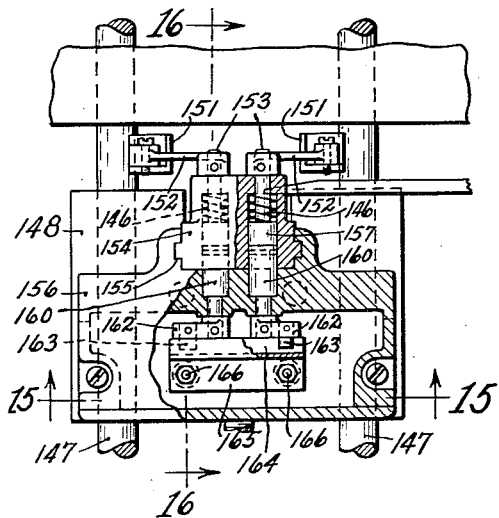
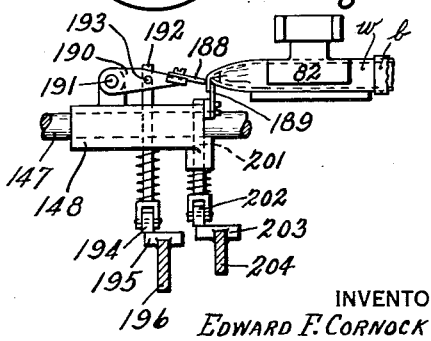
INVENTORS
EDWARD F. CORNOCK AND
KENNETH F. NEWELL
BY Chapin + Neal
ATTORNEYS

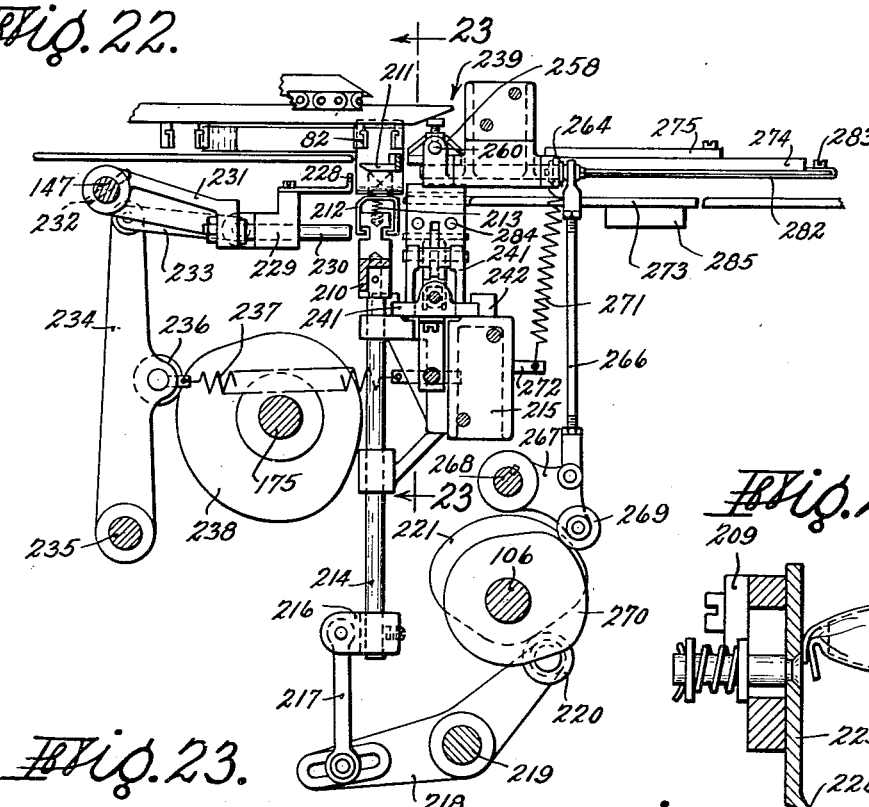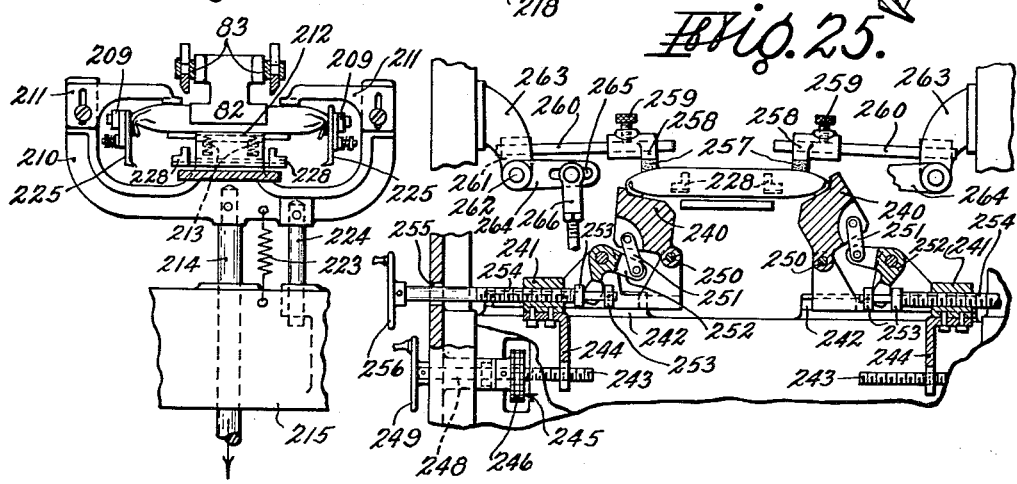

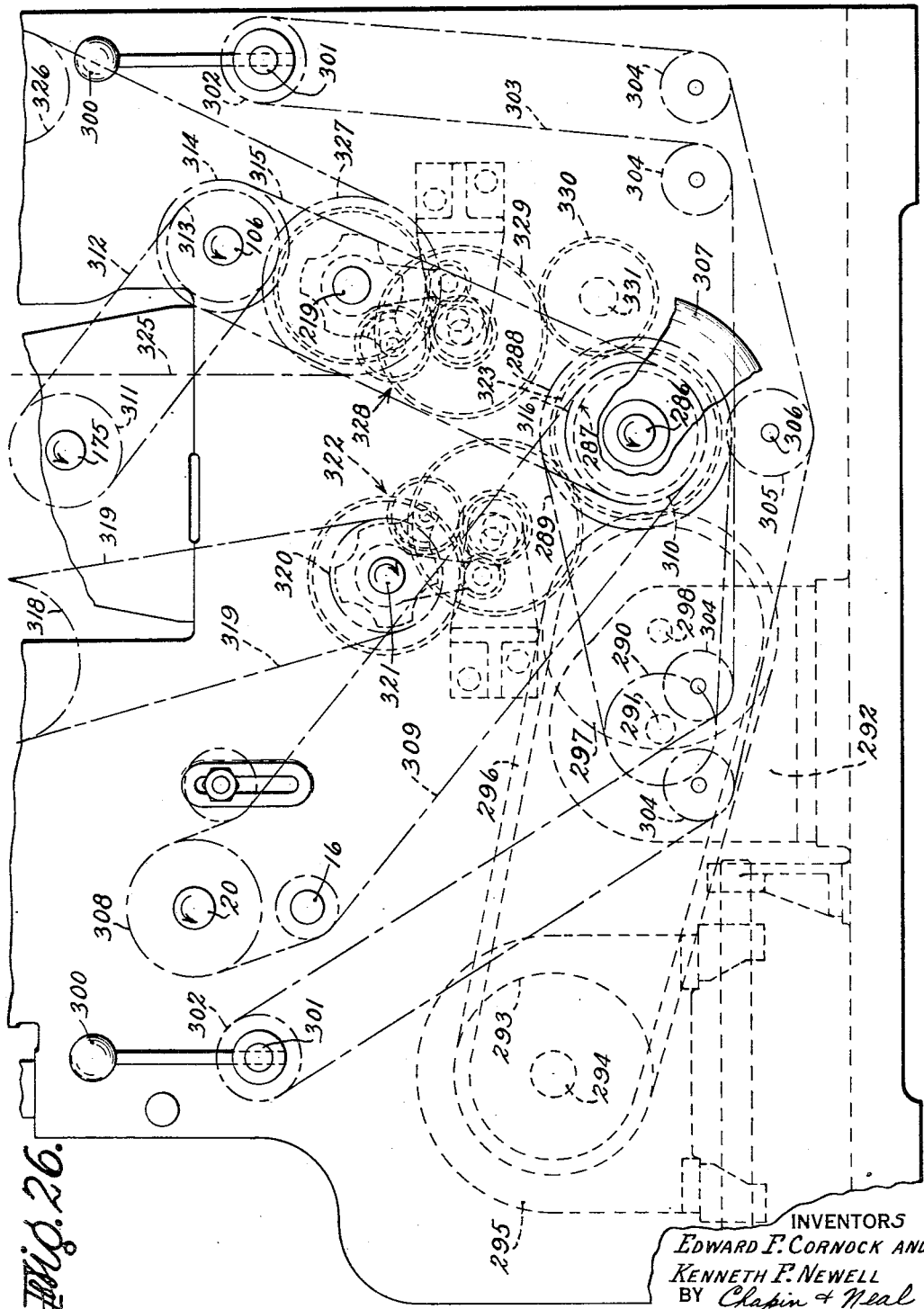

Aug. 28, 1956    E. F. CORNOCK ET AL    2,760,317
MACHINE FOR WRAPPING CIGARS AND THE LIKE
Filed May 10, 1950    14 Sheets-Sheet 12

Fig. 28.

INVENTORS
*Edward F. Cornock and
Kenneth F. Newell*
BY *Chapin + Neal*
ATTORNEYS Aug. 28, 1956  E. F. CORNOCK ET AL  2,760,317
MACHINE FOR WRAPPING CIGARS AND THE LIKE
Filed May 10, 1950  14 Sheets-Sheet 13
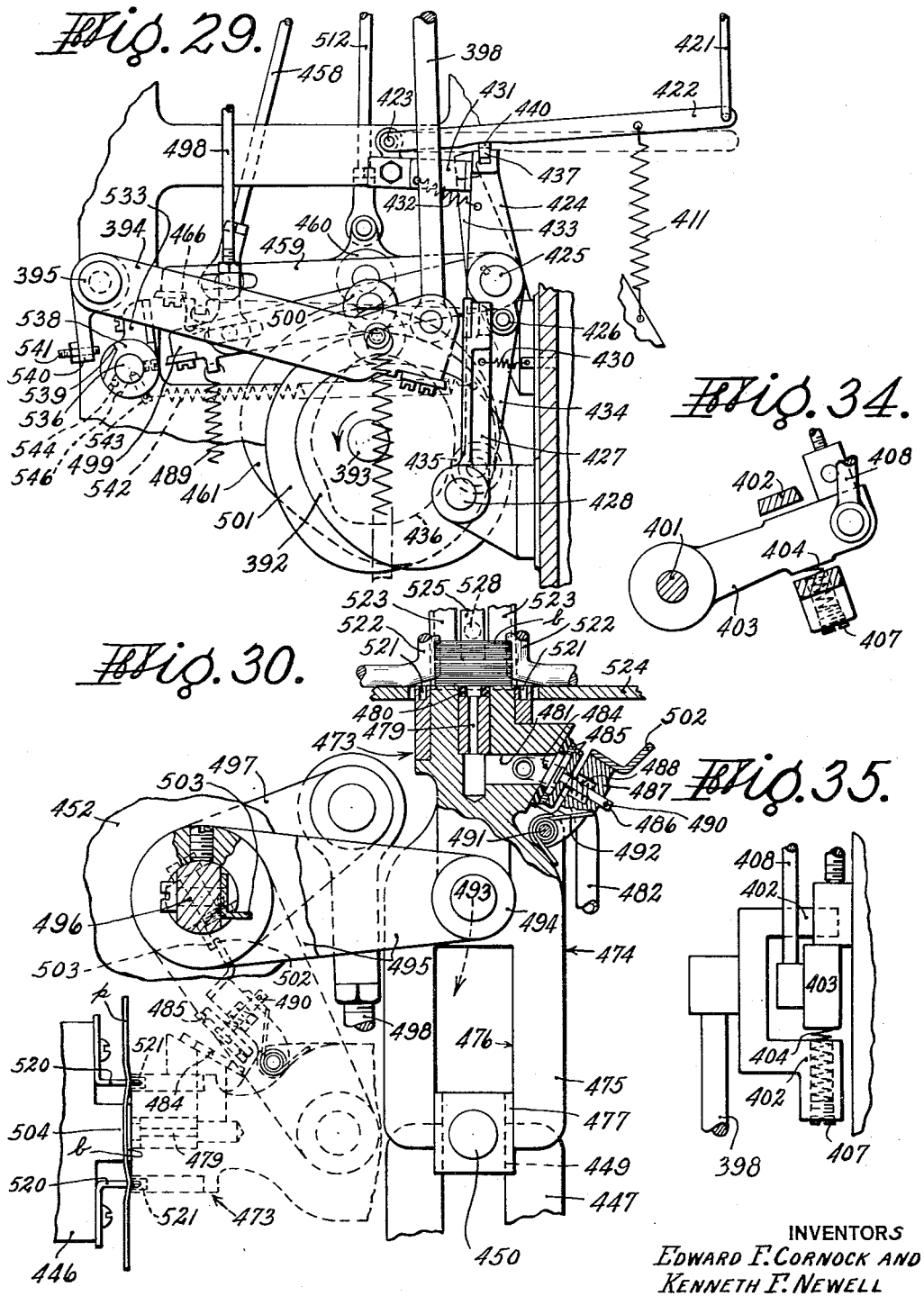
INVENTORS
EDWARD F. CORNOCK AND
KENNETH F. NEWELL
BY Chapin & Neal
ATTORNEYS

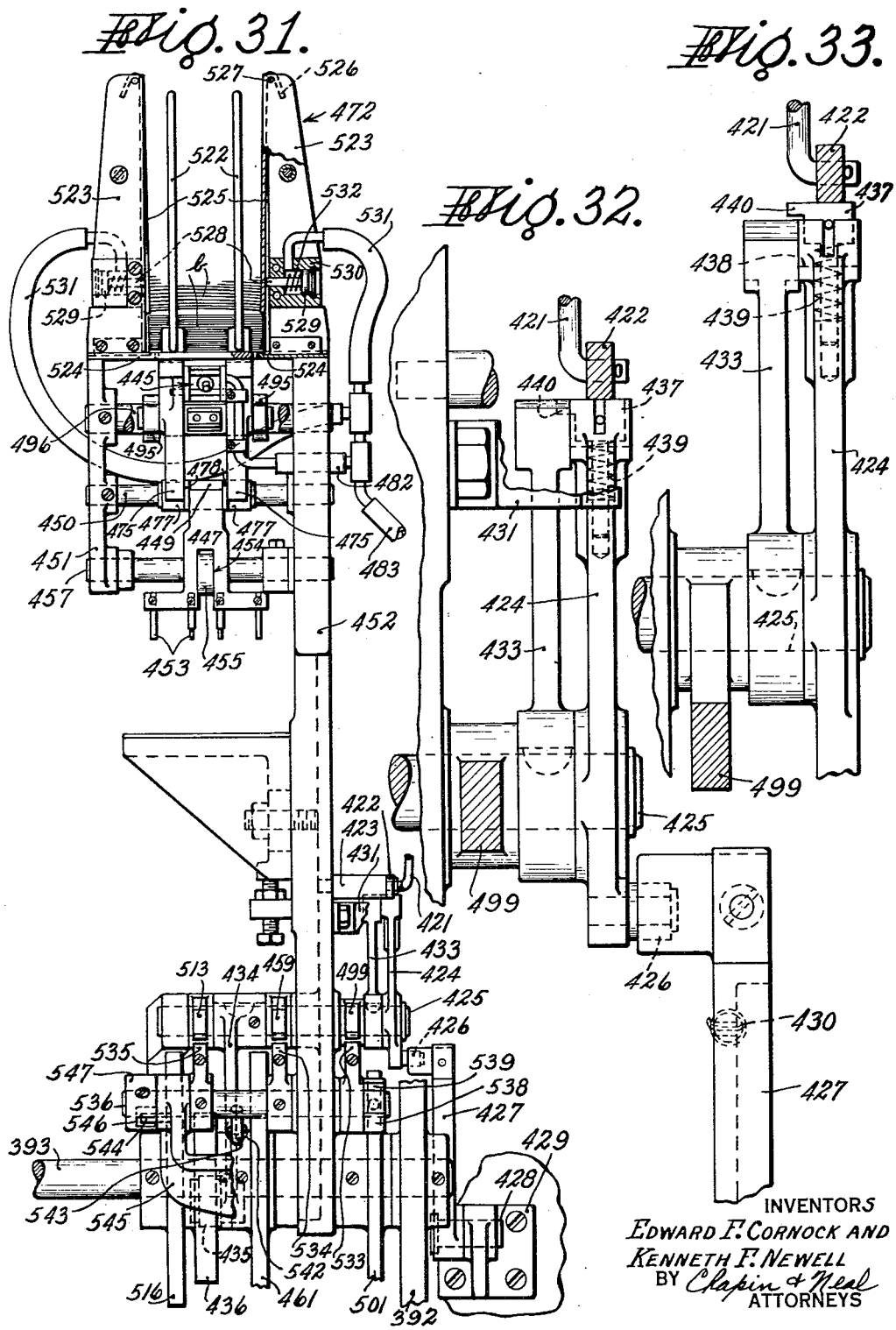

United States Patent Office 2,760,317
Patented Aug. 28, 1956

2,760,317

MACHINE FOR WRAPPING CIGARS AND THE LIKE

Edward F. Cornock, Springfield, and Kenneth F. Newell, Longmeadow, Mass., assignors to Package Machinery Company, East Longmeadow, Mass., a corporation of Massachusetts Application May 10, 1950, Serial No. 161,234

7 Claims. (Cl. 53—73)

This invention relates to an improvement in machines for wrapping cigars and the like.

The principal object of the invention is to increase the speed of operation over that of machines presently available and at the same time secure a smoother more positive operation of the parts with greater accuracy in the wrapping, and more precise and easier accommodation of the instrumentalities to various sizes and shapes of cigars. A further object is to provide improved mechanism for handling the cigars as they pass through the wrapping instrumentalities. Another object is to provide a structure which will permit banding or labeling of the cigar or other article as an intergated operation with the wrapping and without sacrificing efficiency in the wrapping operation. Other and further objects and advantages of the invention will be made apparent in the following specification and claims.

In the drawings,

Fig. 2 is a plan view of the structure shown in Fig. 1 with the upper conveyor and associated parts removed, and portions of the paper feed and associated parts omitted;

Fig. 3 is a transverse sectional view substantially on line 3—3 of Fig. 1;

Fig. 4 is a transverse partial sectional view substantially on line 4—4 of Fig. 1;

Fig. 5 is a transverse sectional view substantially on line 5—5 of Fig. 1;

Fig. 6 is a detail side elevational view looking from the right of Fig. 5 and showing the wrapper feed rolls;

Fig. 7 is a sectional view substantially on line 7—7 of Fig. 1;

Fig. 8 is a sectional view substantially on line 8—8 of Fig. 1;

Fig. 9 is a detail sectional elevational view with parts broken away showing the cigar feeding structure;

Fig. 10 is a view similar to Fig. 9 showing the initial wrapping folding mechanism;

Fig. 11 is a detail view of the rear under folder in operation;

Fig. 12 is a detail plan view on a larger scale of one of the cigar grippers of the second conveyor;

Fig. 13 is a sectional view substantially on line 13—13 of Fig. 12;

Fig. 14 is a detail view of the gripper opening mechanism;

Fig. 15 is a sectional view of the clamping means which hold the wrapper around the cigar during the end tucking operation taken substantially on line 15—15 of Fig. 17;

Fig. 16 is a sectional detail on a larger scale than Fig. 15, substantially on line 16—16 of Fig. 17;

Fig. 17 is a detail plan view of the clamping means, partly in section and of the same scale as Fig. 16;

Fig. 18 is a detail plan view of one of the side tuckers, the top end folders being omitted;

Fig. 19 is a detail sectional view substantially on line 19—19 of Fig. 18 showing the means for actuating the side tuckers;

Fig. 20 is a detail view, similar to Fig. 19, showing the means for actuating the top end folders;

Fig. 21 is a side detail view showing one set of the top and bottom end folders in operating position;

Fig. 22 is a detail side elevational view of the means for transferring the cigars from the conveyor to the final folding and sealing means;

Fig. 23 is a detail sectional view substantially on line 23—23 of Fig. 22;

Fig. 24 is an enlarged sectional detail view showing the manner of mounting the guide extension members;

Fig. 25 is a detail view of the end sealers partly in section;

Fig. 26 is a fragmentary side elevational view showing the driving mechanism;

Fig. 28 is a similar view looking from the left of Fig. 1;

Fig. 29 is a fragmentary view similar to Fig. 28 but showing the wrapper web drive and associated parts in a different position;

Fig. 30 is an enlarged detail partly in section of the suction head of the band applying mechanism;

Fig. 31 is an elevational view looking from the right in Fig. 27, parts being omitted and parts being shown in section;

Fig. 32 is a detail sectional view on a larger scale substantially on line 32—32 of Fig. 28;

Fig. 33 is a view similar to Fig. 32 showing the parts in different position;

Figs. 34 and 35 are fragmentary detail views of the lost motion lever connection; and Fig. 36 is a fragmentary detail of the cutting mechanism taken substantially on line 36—36 of Fig. 5.

Figure 1:
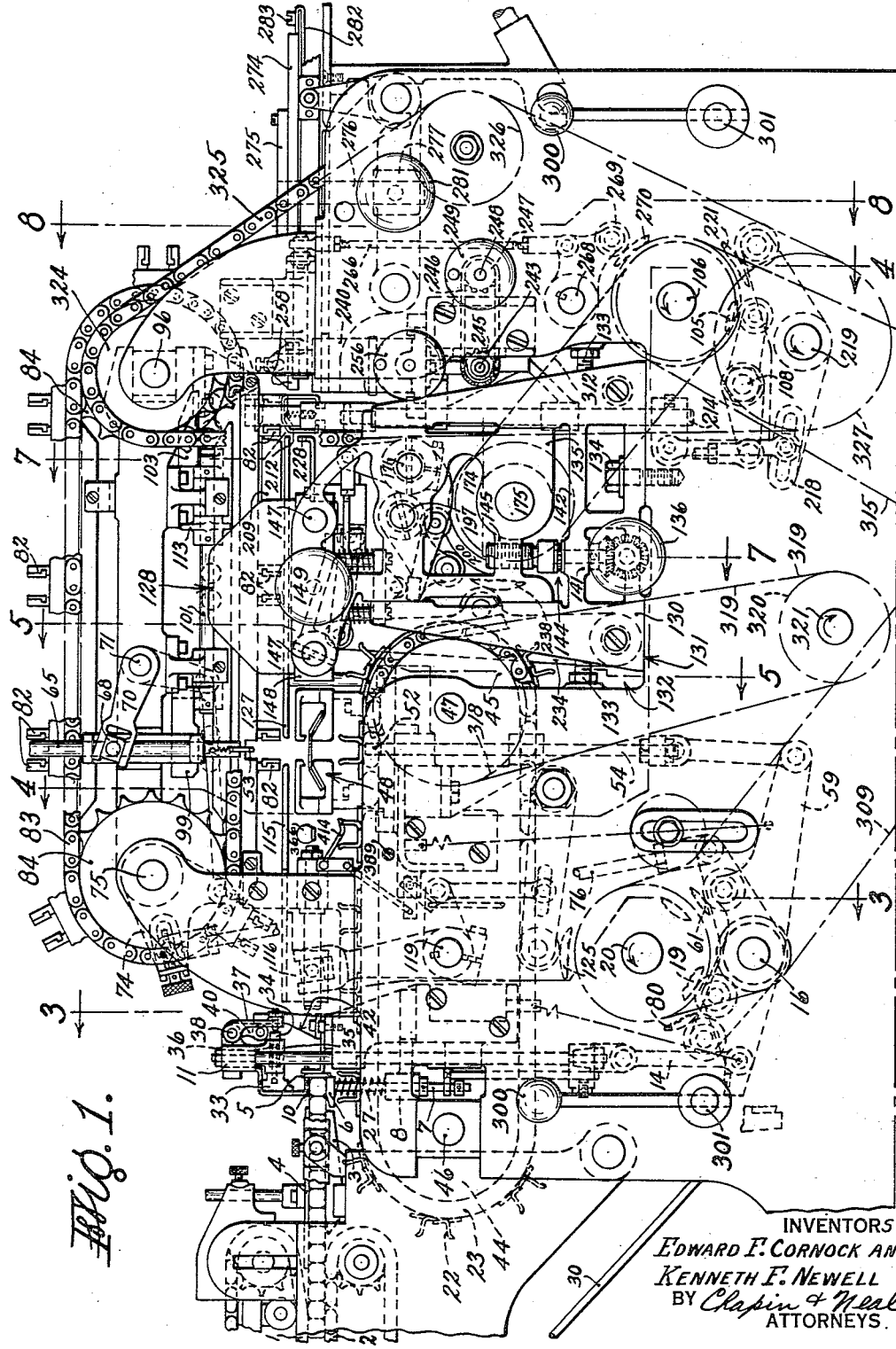
Fig. 1 is a side elevational view.

Referring to the drawings, more particularly to Figs. 1, 3 and 9, the cigars to be wrapped and banded are fed to the machine by any suitable means such as a pair of constantly traveling belts or chains 1 and 2 which engage the upper and lower sides of the cigars. As shown in Fig. 1, the line of cigars is advanced over a platform 3 and beneath retaining guide bar 4 until the line is halted by the engagement of the leading cigar with a stop member 5. The leading cigar in this position rests upon spaced supporting members 6, positioned beyond the end of platform 3 and carried by rods 7 vertically slidable in bosses 8 extending from a transverse frame member 9, and beneath plunger members 10 secured to an upper cross head 11. The cross head 11 is connected at its ends to the ends of a lower cross head 12 by rods 13. The lower cross head 12 is connected by a link 14 to the end portion of a lever 15, pivoted on a cross shaft 16, which lever carries a cam roll 18 held in engagement with a cam 19 secured to a shaft 20, by a spring 21. As the cross heads are moved downwardly by cam 19 from the position shown in Fig. 1 to that of Fig. 9, the cigar positioned on members 6 is engaged by the plunger members and positioned in one of a plurality of pockets 22 carried by conveyor chains 23 which pass between the members 6.

As best shown in Fig. 9, the lower ends of rods 7 are connected by rods 24 to cross head 12 through lost motion connections comprising eye members 25 secured to the upper end of rods 24 and slidable on rods 7 between stop members 26. Springs 27 positioned between members 6 and their bosses 8 normally maintain the lower stops in contact with the eye and permit the supports 6 to yield to prevent damage to the cigars as they are moved downward by the members 10.

Preferably a pivoted latch member 29 (Fig. 9) is connected by a link 30 to a pivoted feeler 31 over which the cigars travel and is adapted in the absence of cigars at a predetermined point in the cigar feed to be swung by a spring 32 to move latch member 29 to the dotted line position shown in Fig. 9 where it engages the free end of lever 15 to hold a cam roll 18 inoperative until the cigar supply is resumed.

In order that the leading cigar may be accurately positioned on the supports 6, means are preferably provided on cross head 11 to align the leading cigar of the feed line when the plungers 10 are down so that said leading cigar will be moved into proper position on the support 6 when the plunger returns to upper position. This aligning means comprises a pair of fingers 33 mounted on pins 34 (Figs. 1 and 9) horizontally slidable on bosses 35 depending from the cross head 11. The pins 34 and fingers 33 carried thereby are held in retracted position by springs 36, as shown in Fig. 1, when the cross head is in upper position. When the cross head is lowered fingers 33 are projected into aligning engagement with the leading cigar of the feed line as shown in Fig. 9 by means of arms 37 fixed to a rock shaft 38 carried by the cross head. The latter shaft carries an arm 40 (Figs. 3 and 9) provided with a cam roll 41 which as the cross head moves downwardly engages a fixed cam 42, secured to a bracket 43 carried by frame member 9, whereby shaft 38 is rocked to cause the pins 34 and aligning fingers 33 to be projected against their springs 36 to bring fingers 33 into engagement with the lead cigar.

The chains 23 which carry pockets 22 are trained around sprockets 44 and 45 secured respectively on shafts 46 and 47, the latter being intermittently driven by means later described.

The cigars positioned in pockets 22, as above described, are advanced thereby to the first wrapping instrumentalities which will be described with particular reference to Figs. 2, 5 and 10. As shown in the latter figure a pocket 22 is brought to rest beneath a wrapper guide and folding box generally indicated at 48. As shown, this box comprises spaced upper plate members 49 and spaced lower plate members 50. The end of a wrapper web is fed between the upper and lower plates and the end portion severed to form a wrapper w. The wrapper feeding and severing means generally indicated at 51 will later be described in detail.

As the pocket 22 comes to rest the cigar c is lifted from the pocket by spaced elevator members 52 which engage the cigar outwardly of the ends of the cigar. As the cigar is moved upwardly into contact with the wrapper, the upper face of the wrapper is met and engaged by yieldable wrapper retainer fingers 53.

The elevator members are mounted on the upper end of rods 54 (Figs. 5 and 10) slidable in bearings 55 formed in a frame bracket 56. The lower ends of rods 54 are connected to a cross head 57 which is connected by a link 58 to the outer end of a lever 59 pivoted on the cross shaft 16. Lever 59 carries a cam roll 60 which is held in operative engagement with a cam 61, secured to shaft 20, by a spring 62. The retainer fingers 53 are pivoted at 63, in the forked ends 64 of rods 65, springs 66 normally holding the fingers against stops 67 formed at the base of the forks but permitting the fingers to yield as they are brought into contact with the wrapper overlying the cigar. The rods 65 are provided adjacent their upper ends with trunnion blocks 68 engaging in ways 69 formed in respective arms 70 fixed to a rock shaft 71. An arm 72 fixed to rock shaft 71 is connected by a link 73 to one arm of a bellcrank 74 pivoted on a cross shaft 75. A link 76 has its upper end adjustably connected at 77 to the other arm of the bellcrank, its lower end being pivotally connected to one end of a lever 78 pivoted on cross shaft 16. The other end of lever 78 carries a cam roll 79 which is held in operative engagement with a cam 80 by a spring 81.

As the cigar is raised by elevator members 52, with the wrapper held in position by the retainer fingers 53, the cigar and wrapper are carried between the upper plates 49, the adjacent edges of which fold the side portions of the wrapper downwardly along the sides of the cigar, as shown in Fig. 9.

At the upper limit of the movement of the elevators 52 and retainer fingers 53 the cigar and wrapper are carried between one pair of a plurality of pairs of gripper members 82 which are carried in spaced relation by a second set of conveyor chains 83. Chains 83 are trained around sprockets 84 mounted on shafts 75 and 96 which are intermittently driven by means later described.

As best shown in Figs. 12 and 13 each pair of grippers 82 is mounted on a U shaped frame 85. The leading end of the frame 85 is pivotally connected to the chains 83 by pintles 86, while the trailing end is pivotal and slidably mounted on trunnion blocks 87 which are pivotally mounted on pintles 88 carried by the chains, and slidable in forks 89 formed in the ends of the side members of the U frame. The grippers 82 are carried at the lower ends of respective levers 90 secured respectively on parallel rock shafts 91 journaled in the side members of the U frame 85. Each lever 90 is formed at its upper end with an extension 92 which carries an anti-friction roll 93 and with an extension 94 which carries an adjustable stop 95 engageable with the frame 85. The levers 90 are connected, below their pivots, by a spring 97 which tends to draw them toward each other, such movement being limited by the stops 95. The extensions 92 cross each other so that downward pressure on rolls 93 tends to spread or open the grippers against the action of spring 97. To assure symmetrical movement of the grippers their pivot shafts 91 are provided with meshing gears 98. Preferably the grippers 82 are releasably connected to their levers 90 so that grippers of different sizes may be used in accordance with the size of the cigars being wrapped.

As best indicated in Figs. 14 and 4, grippers 82 are opened to receive the partially wrapped cigar from the elevators 52 by a shoe 99 carried by an arm 100 fixed to a rock shaft 101 journaled in bracket bearings 102. A second shoe 103 secured to shaft 101 by an arm 104 simultaneously opens the grippers at the discharge station later described. Shaft 101 is actuated from a cam 105, secured to a cam shaft 106, through a lever 107 pivoted at 108 to the side frame and carrying a cam roll 110 at one end which is held in contact with the cam by a spring 111. The other end of lever 107 is connected by a link 112 to an arm 113 secured to the rock shaft 101. The connection of link 112 to arm 113 is made adjustable as indicated at 114, Fig. 4.

Referring again to Figs. 9 and 11, prior to the advance of grippers 82, the rear depending wrapper portion a is folded against the lower face of the cigar by a folder plate 115 projecting from a carriage 116 slidably mounted on parallel rods 117 (Fig. 9). Plate 115 is reciprocated from the position shown in Fig. 9 to that of Fig. 11 by means of arms 118 fixed to a rock shaft 119, the free ends of arms 118 being forked to receive pivoted trunnion blocks 120 carried by the sides of carriage 116. Rock shaft 119 is oscillated by an arm 121 fixed thereto and connected by an adjustable link 122 to a pivoted lever 123 carrying a cam roll 124 held in operative relation with a cam 125 (secured on cam shaft 20) by a spring 126.

The rear underfold having been made by the forward movement of plate 115, as shown in Fig. 11, the cigar is advanced by the grippers over a stationary folder plate 127 to fold forward depending portion b of the wrapper rearwardly over portion a to complete the encirclement of the cigar as shown in Fig. 11.

Following the folding operation just described, the wrapper encircled cigar is brought to rest between, and with the extending ends of the wrapper positioned opposite, opposed end tucking and folding mechanisms, one of which is generally indicated at 128 in Fig. 2, both being shown in Fig. 7. These tucking and folding mechanisms being identical in structure and operation, except as they are opposed to each other, a description of one will serve for both.

As best shown in Fig. 1 the mechanisms 128 are each carried by a U shaped frame 130 supported on the bottom surface 131 of an opening 132 in each side frame of the machine. The frame 130 is adjusted within the opening by threaded studs 133 and held in adjusted position by a bolt 134. Mounted for vertical adjustment within the U frames 130 are sub-frames 135, the vertical adjustment being effected by a hand wheel 136 carried at the outer end of a transverse shaft 137 which carries bevel gears 138 (see also Fig. 7) meshing with bevel gears 139 fixed to vertical shafts 140. The shafts 140 are respectively journaled in bearings 141 formed in cross members 142 of the respective U frames 130 and are held against axial movement in the members 142 by bevel gears 139 and anti-friction thrust bearings 144. The ends of the shafts 140 are threaded in cross members 145 of the sub-frames 135 so that the latter may be simultaneously raised or lowered relative to the U frames 130 by rotation of hand wheel 136.

A pair of parallel rods 147 extend transversely of the machine with their ends fixed in the sub-frames 135. Carriages 148 are slidably mounted on the rods 147 on opposite sides of the path of travel of the conveyors 83, the carriages being adjustable toward and from the conveyor by means of hand wheels 149 secured to the outer ends of shafts 150, journaled in the respective sub-frames 135 against axial movement, and having their inner ends threaded into the adjacent carriages 148.

As best shown in Fig. 2, the instrumentalities 128 are carried by the carriages 148 and each include a pair of clamps 151, shown in detail in Figs. 15, 16 and 17, which engage the end portions of the wrapper around the cigar. The clamps 151 are pivotally connected to the free ends of arms 152 carried by parallel shafts 153 journaled in a block 154 vertically slidable in ways 155 formed in a frame member 156 mounted on carriage 148. The inner ends of shafts 153 are formed with heads 157 having key extensions 158 engaging in slots 159 in the ends of shafts 160 journaled in frame member 156. The shafts 153 can be drawn outwardly against springs 146 to disengage keys 158 from slots 159, permitting block 154 to be lifted upwardly out of the ways 155, the lower side of block 154 being cut away at 161 to permit passage of the slotted ends of shafts 160. By this arrangement the clamps may be quickly removed from the machine for adjustment or replacement. The outer ends of shafts 160 carry short arms 162 provided with pins 163 riding in a cam slot 164 formed in a block 165. Block 165 is fixed to the upper ends of rods 166 slidable in carriage 148 and fixed at their lower ends to a cross head 167 carrying a cam roll 168. Cam roll 168 rests on a bar 169 fixed to the end of a lever 170, fixed at its other end on a rock shaft 171. An arm 172 fixed to the shaft 171 intermediate its ends carries a cam roll 173 engaging a cam 174 fixed to a cam shaft 175 (see also Fig. 7). Cam 174 oscillates the rock shaft and lever 170 to thereby reciprocate block 165 causing pins 163 to slide in slot 164 to swing clamps 151 into and out of engagement with the end portion of the partially wrapped cigar as shown in Figs. 17 and 18. The clamps 151 hold the wrapper from disarrangement on the ends of the cigar while side tucks are made in the extending end portions of the wrapper. The tucker heads 177, of which there are a pair at each end of the cigar, are carried at the ends of arms 178 pivoted to arms on the upper ends of vertical shafts 179 journaled in carriage 148. Fixed to the lower ends of shafts 179 are arms 180 connected by adjustable links 181 to arms 182 adjustably secured (see Fig. 19) to a sleeve 183 rotatable on shaft 171. Fixed to sleeve 183 intermediate its ends is an arm 185 carrying a cam roll 186 engaging a cam 187, fixed to cam shaft 175, by which sleeve 183 is rocked to oscillate the arms 182 and through links 181 to oscillate the shafts 179 and swing the tucker heads 177 toward and away from each other. As the tucker heads swing toward each other they engage the sides of the extending ends of the wrapper and form an accordion tuck or pleat therein as shown in Fig. 18.

As the tucks are made, upper and lower end folding members 188 and 189 respectively, Figs. 20 and 21, move into engagement with the upper and lower faces of the extending wrapper ends and as the tuckers withdraw the upper folding members move downwardly while the lower folding members move upwardly as shown in Fig. 21 to fold the wrapper ends downward at right angles to the axis of the cigar and along a line spaced slightly from the ends of the cigar. The upper folders 188 are adjustably carried at one end of levers 190 which are pivoted at their opposite ends to the carriages 148 as at 191. Vertical rods 192, slidably guided in the carriages, are pivotally connected at their upper ends to the levers 190 as at 193 and their lower ends are provided with rolls 194 engaging tappet bars 195 carried at the ends of arms 196 fixed to a rock shaft 197. One of the arms 196 carries a cam roll 199 engaging a cam 200, fixed to the cam shaft 175, by which the rock shaft 197 and arms 196 are oscillated to actuate the upper folder members. Similarly the lower folding members 189 are adjustably secured to the upper ends of rods 201 vertically slidable in the carriages 148 and provided at their lower ends with rolls 202 engaging tappet bars 203 carried at the ends of arms 204 fixed to a rock sleeve 205 rotatable on rock shaft 197, one of the arms 204 being provided with a cam roll 207 engaging a cam 208 fixed to cam shaft 175.

As the cigar with its enclosing wrapper is advanced by the carrier from the wrapping instrumentalities just described, the down-turned wrapper ends are held in position by side rails 209, Figs. 22, 23, and 24. When the conveyor again halts the cigar is brought to rest within the arms of the yoke by which the cigar is carried downwardly from the conveyor. As best shown in Figs. 22 and 23, the down-carrier comprises the yoke 210 having adjustable fingers 211 which engage the upper face of the cigar outwardly of the conveyor grippers as the cigar rests upon a platform 212 carried by the yoke and cushioned by springs 213. The yoke is reciprocated vertically by a rod 214 connected at its upper end to the yoke and slidably mounted in a cross frame member 215. The lower end of rod 214 carries a collar 216 to which is pivoted one end of a link 217, the other end of which is adjustably and pivotally connected to one arm of a bell crank 218 pivotally mounted on a shaft 219. The other arm of bell crank 218 carries a cam roll 220 engaging a cam 221 secured on cam shaft 106, driven as later described. A spring 223 maintains the roll 220 in operative contact with its cam which is shaped to reciprocate the yoke between its upper position shown in Fig. 23 and its lower position shown in Fig. 22. A short guide rod 224 carried by the yoke and slidable in an opening in the frame member 215 prevents rotation of the yoke in its vertical movement.

As the cigar is moved downwardly from the conveyor the downwardly extending ends of the wrapper are held in place (Figs. 23 and 24) by extensions 225 of the side rails 209. At their lower edges the extensions 225 are formed with inwardly directed flanges 226 which turn the wrapper ends inwardly beneath the cigar in position for sealing as later described. As shown in Fig. 22, the down-carrier in its lowermost position presents the cigar to a U-shaped discharge plunger 228 carried by a block 229 slidably mounted on rods 230. The rods 230 are secured in a bracket 231 which is pinned at 232 to one of the cross rods 147 (see also Fig. 2) previously mentioned. Block 229, with the discharge plunger carried thereby is reciprocated on rods 230 by a link 233 connecting the block to one end of a lever 234 pivoted at its other end on a cross shaft 235 and provided intermediate its ends with a cam roll 236 which is held by a spring 237 in operative engagement with a cam 238 secured on cam shaft 175.

Forward movement of plunger 228 discharges the wrapped cigar from the down-carrier and into heat sealing means generally indicated at 239 in Fig. 22. In the heat sealing device the ends of the cigar rest on adjustable heating blocks 240, the upper surfaces of which are shaped to a general conformation with the end portion of the cigar. The blocks 240 are mounted on respective carriages 241 slidable in ways 242. The carriages, which also support the angular adjusting means for the blocks, are independently adjustable toward and from each other by means of screws 243 (Fig. 25) which are threaded in brackets 244 extending downwardly from the carriages. The screws 243 carry sprockets 245 connected by chains 246 to sprockets 247 secured to stub shafts 248 carrying hand wheels 249 (see also Fig. 1) by which the carriages may be adjusted inwardly or outwardly for cigars of different length.

The blocks 240 are pivoted at 250 to their carriages and are connected by links 251 to one arm of respective bell cranks 252. The other arm of each bell crank is engaged between collars 253 secured to a screw 254 threaded in its carriage and extending through an opening 255 in the side frame of the machine, each screw being provided with a hand wheel 256. The opposite ends of cigars are frequently of different shape and the adjustments just described permit the blocks 240 to be variously adjusted to conform to the particular end shape of the cigar being wrapped to assure an efficient sealing of the end tucks of the wrapper to the underside of the cigar. Adjustment of the carriages and of the blocks relative to the carriages can be made while the machine is in operation.

The cigars are pressed against the sealing blocks 240 by presser members 258 adjustably secured by thumb screws 259 on rods 260. The members 258 are provided with pads 257 of sponge rubber or the like to apply a resilient pressure to the cigars. The rods 260 are secured in arms 261 fixed to short shafts 262 rotatably journaled in brackets 263. The other ends of the shafts 262 carry arms 264 which are provided with slots 265 in which the upper ends of links 266 are adjustably pivoted. The lower ends of links 266 are pivotally connected to respective levers 267 secured at one end to a rock shaft 268, a free end of one of the levers being provided with a cam roll 269 which is held in operative engagement with a cam 270 by a spring 271, connected between one arm 264 and a fixed pin 272. The cam 270 is secured to the previously mentioned cam shaft 106 and is so formed that the presser members 257 engage the cigars to press them against the heater blocks 240 in the interim between their deposit on the blocks and their discharge therefrom by the next incoming cigar.

The cigars are discharged from the blocks 240 onto a heated plate 273 which seals the longitudinal under fold or seam as the wrapped cigars advance over the plate. The cigars on their travel over plate 273 are held in position and lightly pressed against the plate by a bar 274, Figs. 1 and 2, carried by a cantilever arm 275 fixed to a post 276 vertically adjustable in a boss 277 formed in a bracket 278. Post 276 is held in desired adjusted position in boss 277 by an elongated "set screw" 280 provided with a hand knob 281 outwardly of the frame of the machine. As shown the bar 274 is covered with a piece of resilient material such as cloth or rubber 282 secured at its ends as by screws 283.

The blocks 240 and plate 273 are heated in any suitable manner as by electric heating units indicated at 284 and 285 respectively (Fig. 22).

From plate 273 the wrapped cigars are received on a table from which they are removed by hand or suitable conveying means for packaging.

As shown in Fig. 26 the various operating shafts above described are powered from a main drive shaft 286 which is driven through a suitable clutch, generally indicated at 287 from a sprocket 288 connected by chain 289 to a sprocket 290 fixed to a shaft 291 of a conventional speed reducing unit indicated at 292. The unit 292 is driven from a pulley 293, fixed to the shaft 294 of a motor 295, by a belt 296 passing around a second pulley 297 fixed to the input shaft 298 of the unit.

For convenience means are presented for controlling the clutch 287 from either end of the machine as by handles 300 fixed to respective shafts 301 which carry sprockets 302 connected by a chain 303. Chain 303 which passes under guide sprockets 304 drives a sprocket 305 fixed to a shaft 306 by which clutch 287 is actuated through a suitable cam and fork not shown.

Shaft 286 is preferably provided with a hand wheel 307 by which the machine can be turned over by hand for adjusting purposes and the like.

Cam shaft 20 from which the cigar feed elevator 52 and under folder 115 are operated as previously described carries a sprocket 308 connected by a chain 309 to a sprocket 310 fixed to the main drive shaft 286. Cam shaft 175, from which the end folders, tuckers, and discharge plunger are actuated carries a sprocket 311 connected by a chain 312 to sprocket 313 on cam shaft 106 from which the gripper opening shoes 99 and 103, the down-carrier 210 and presser members 258 are operated. Shaft 106 carries a sprocket 314 which is driven by a chain 315 passing around a sprocket 316 on the main drive shaft 286.

The drive shaft 47 of conveyor 23 carries a sprocket 318 which is connected by a chain 319 to a sprocket 320 fixed to a shaft 321 driven through a "wobble gearing" generally indicated at 322 from a gear 323 fixed to main drive shaft 286. Similarly the rear shaft 96 of the conveyor 83 is provided with a sprocket 324 which is driven by a chain 325 passing around an idle sprocket 326 and a sprocket 327 fixed to a shaft 219 driven by a "wobble gearing" generally indicated at 328 through a gear 329 which meshes with an intermediate gear 330 carried by a stub shaft 331 and meshing with gear 323 on the main drive shaft 286. While any suitable intermittent drive may be used for the conveyors, the wobble gearing is preferred because of the fast smooth acceleration and deceleration which such gearing affords.

Figure 27:
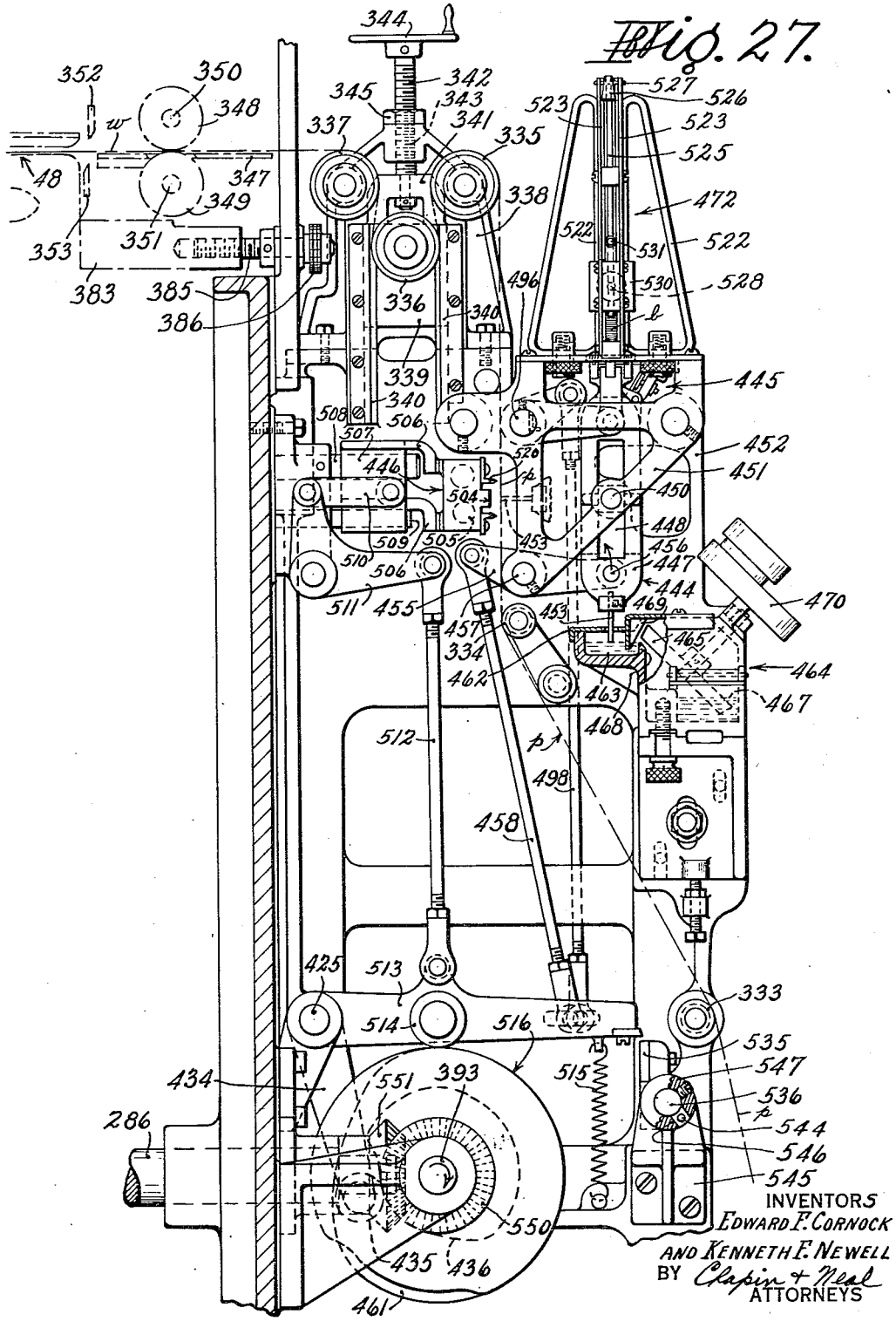
Fig. 27 is a side elevational view of the paper feed and band applying mechanism looking from the right of Fig. 1.

Wrappers are successively supplied to the box 48 (Fig. 1) in position to be engaged by the cigars as the latter are moved into the grippers 82 of conveyor 83, from a web p, see Fig. 27. As best shown in the latter figure the web p is drawn from a supply roll, not shown, and passes over guide rolls 333 and 334 and successively over, under and over guide rolls 335, 336 and 337 respectively. Rolls 335 and 337 are journaled in a bracket 338, while the center roll 336 is journaled in a plate 339 slidable vertically in ways 340 formed in the bracket 338. Plate 339 is carried at the end of a yoke 341 which is swivelled to the lower end of a screw 342 threaded through bracket 338 at 343 and provided at its upper end with a hand wheel 344 by which plate 339 may be adjusted in its ways to lengthen or shorten the loop of the wrapper web passing around roll 336 and thereby register a given portion of the web relative to the cigar. The screw 342 is held in adjusted position by a nut 345. Such registration is desirable where the wrapper web carries printed matter or has successive cigar bands secured to the web as later described.

From roll 337 the web passes over plate 347 and between feeding rolls 348 and 349 (Figs. 2, 5 and 6), fixed on a shaft 350 and 351 respectively. Rolls 348 and 349 project the end of the web between knives 352 and 353 and into box 48. As best shown in Fig. 6 shaft 350 also carries two frusto-conical rolls 354, one at either side of roll 348. Rolls 354 are of larger diameter than roll 348 and bend the edge portions of the web downwardly, the adjacent edge portions of plate 347 being bent downwardly as at 355 to conform to the surface of rolls 354 so that the projected portion of the web is formed into an inverted U shape giving it sufficient stiffness to accurately enter box 48 and conform to the surface of members 50. The inverted U shape also facilitates the draping of the wrapper downwardly at the sides of the cigar as the cigar carries it upward after the projected portion is severed from the web as later described. Guide bars 356 which extend between the ends of roll 348 and the adjacent rolls 354 keep the center portion of the web close to plate 347 until the end of the web is projected between the cutting knives.

Referring to Figs. 2, 5 and 6, shaft 350 carries a gear 357 meshing with a gear 358 fixed on one end of shaft 351, the other end of which carries a gear 359. Gear 359 meshes with a gear 360 fixed to a hub 361 which carries the outer member 362 of a free-wheeling type of ratchet and is freely mounted on a short shaft 363. The inner ratchet member (not shown) is fixed to one end of the shaft 363, the other end of which carries a pinion 364 which meshes with rack teeth 365 formed on the underside of a drive rod 366. The direction of the ratchet is such that the wrapper web is fed when the rod 366 is moving in the direction of the arrows in Figs. 5 and 28.

As shown in Figs. 5 and 36, the upper knife 352 is fixed to a bracket 368 provided with ways 369 in which a plate 370 is slidably mounted. Lower knife 353 is carried by a plate 371 pivoted at 372 to plate 370. A compression spring 373 positioned between plates 370 and 371 maintains the ends of the lower knife against the face of bracket 368 to assure a shearing action. Plate 370 is connected to a plate 374 also slidable in ways 369 by a spring 375 connected to pins 376 carried by plates 370 and 374. The plates are held in abutting relation by the spring and are reciprocated in the ways by an adjustable link 377 having a universal connection 378 at its upper end to plate 374 and by a similar connection 379 at its lower end to one arm of a bell crank lever 380, the other arm of which carries a cam roll 381 operatively engaging a cam 382 fixed to cam shaft 20.

Bracket 368, feed rolls 348, 349 and their driving gears are all mounted on a carriage 383 (Figs. 6 and 27) which is slidable in ways 384. Carriage 383 is adapted to be positioned in its ways by a screw 385 rotatably mounted in the frame and having one end threaded into the carriage. The outer end of screw 385 carries a sprocket 386 connected by a chain 387 to a sprocket 388, see Figs. 4 and 6, which is carried by a long cross shaft 389 operable by a hand wheel 390 from the opposite side of the machine. By adjusting the position of carriage 383 the wrapper can be properly centered with respect to the cigars.

As best shown in Fig. 28, the web feed is driven from a cam 392 secured to a constantly rotating cam shaft 393. A lever 394 pivoted at one end to the frame at 395 carries, intermediate its ends, a cam roll 396 which is held in operative engagement with cam 392 by a spring 397. A link 398 is pivotally connected at its lower end to the free end of a lever 394, the upper end of link 398 being pivotally connected at 399 to a lever 400 pivoted at one end to the frame as at 401. The outer end of lever 400 is formed with spaced lugs 402. A lever 403 also pivoted at 401 extends between lugs 402 and is urged toward engagement with the upper lug 402 by a spring 404 positioned in a bore 405 formed in a boss 406 formed on the lower lug 402. The spring 404 is compressed between the lever 403 and a screw 407 threaded in bore 405. The free end of lever 403 is connected by link 408 to a block 409 adjustably secured in a slot 410 formed in one arm of a bell crank 412, the other arm of which is pivotally connected at 413 to the outer end of rack rod 366. As will be evident the extent of movement of rod 366 and therefor the extent of the feeding rotation of the feed rolls can be adjusted by adjusting the position of block 409 in slot 410 to provide wrappers of various length to accommodate various sizes of cigars, the wrapper being centered with respect to the cigar by adjustment of carriage 383 as previously described.

Preferably the feeding of a wrapper is made dependent upon the presence of a cigar in position to receive it. For this purpose a pivoted detector 414, see Figs. 4 and 9, is positioned over the position of rest of the pockets 22 at the position immediately preceding that at which a wrapper is fed. The detector 414 is secured to a rock shaft 415 to one end of which is fixed an arm 416 connected by a link 417 to an arm 418 fixed to one end of a rock shaft 419. The other end of shaft 419 is provided on its opposite end with an arm 420 connected by a link 421 to one end of a lever 422 which, as shown in Figs. 28 and 29, is pivoted to the frame at 423 and drawn downwardly by a spring 411. A latch operating lever 424 is freely pivoted on the end of a rock shaft 425 to swing in a vertical plane beneath lever 422. A roller 426 is carried at the lower end of lever 424, and a latch member 427, pivoted at 428 to a bracket 429, is held against the roller 426 by a relatively light spring 430 so that the latch normally follows the movement of the latch operating lever 424. When the supply of cigars is constant, lever 424 is held against a stop member 431 by spring 432 as shown in Fig. 29. Splined to rock shaft 425 is an arm 433 which is positioned closely beside the latch operating lever, see Figs. 31, 32, and 33. A second arm 434 (Figs. 28 and 31) also splined to rock shaft 425 carries a cam roll 435 which is held (by a spring—later referred to) in operative engagement with a cam 436, fixed to the constantly rotating cam shaft 393. Arm 433 is, in the course of one cycle of operation of the machine, swung by cam 436 from the position of Fig. 29 to that of Fig. 28 and back. Latch operating lever 424 is provided at its upper end with a block 437 slidably mounted in a slot 438 and urged outwardly of the slot by a spring 439. Block 437 is formed with a transversely extending finger 440 which when block 437 is pressed inwardly of its slot by a downward movement of lever 422 is positioned in the path of the arm 433 as shown in Fig. 32.

As a pocket 22 comes to rest beneath detector 414 the arm 433 is in its rearmost position and to the rear of arm 424 as shown in Fig. 29. If no cigar is present in the pocket lever 422 will remain in the dotted line position of the latter figure (full line position of Fig. 28) and on the succeeding forward movement of arm 433 the latter will engage finger 440 and swing lever 424 away from stop 431 to the position shown in Fig. 28, thereby moving latch 427 beneath the end of lever 394 which has just completed its feeding movement and is about to descend. Arm 433 dwells in its outward position a sufficient length of time for the end of lever 394 to engage the latch 427 against which it is held by the force of relatively strong spring 397 which is of sufficient strength to prevent relatively weak spring 430 from withdrawing the latch as arm 424 swings back against its stop. The slight downward movement of arm 394 into engagement with the latch 427 is taken up by the lost motion between levers 400 and 403, which lost motion is provided for the purpose, and prevents any inching forward of the wrapper web. Feeding of the wrapper web is thus prevented for one cycle of operation of the machine. Assuming that the succeeding pocket 22 carries a cigar, lever 422 will have been raised thus releasing finger 440 permitting arm 433 to pass under it on its next forward movement leaving lever 424 against stop 431 so that as lever 394 is again raised by its cam to release latch 427, the latter is swung out of the path of lever 394 by spring 430 and a length of wrapper is again fed in proper timed relation. In the normal operation of the machine detector 414 and lever 422 drop between filled pockets 22 as they are advanced, but at that time arm 433 is in its rearward position behind arm 424 which is against its stop. In the event of the passage of a series of empty pockets detector 414 remains down and the arms 424 and 433 rock back and forth together with lever 422 holding finger 440 in position for engagement with arm 433.

Preferably during the dwell of the wrapper web feed, that is during the idle forward movement of rack 366, a cigar band is secured to the web in proper position so that when that portion of the web is severed to form a "wrapper" the band will be in desired location and will be wrapped about the cigar with the wrapper. As best shown in Figs. 27, 30 and 31, the band applying means includes an adhesive applying member 444, a band or label applying member 445 and a heated platen member 446.

The adhesive applying member comprises a carrier 447 provided at its upper end with a slot 448 (Fig. 27) which slidably engages a squared sleeve 449 (Fig. 31) rotatably mounted on a shaft 450 fixed at its ends in frame members 451 and 452. A plurality of dauber pins 453 are adjustably fixed to the lower end of carrier 447 and the lower end of the carrier is bifurcated as at 454 to receive the end of a lever 455, said end being pivoted to the carrier at 456. Lever 455 is pivoted intermediate its ends on a cross shaft 457, the other end of the lever being connected by a link 458 to an operating lever 459 (Fig. 29) pivoted on shaft 425. The operating lever 459 carries a cam roll 460 held by a spring 466 in operative engagement with a cam 461 fixed to cam shaft 393.

In the position of the carrier 447 shown in full lines in Fig. 27 the daubers extend through openings formed in the cover 462 of an adhesive supply chamber 463 of a reservoir generally indicated at 464. Chamber 463 is supplied with adhesive by a constantly rotating roll 465 from the main supply chamber 467. A baffle 468 maintains a constant level in chamber 463 and a second baffle 469 against which roll 465 discharges adhesive prevents surging of the adhesive in chamber 463 as the adhesive is supplied to it. Roll 465 is driven by a small electric motor indicated at 470.

The daubers 453 are adjusted to make a surface contact with the adhesive in chamber 463 so that a small controlled amount of adhesive is picked up. By reason of the slidable and pivotal mounting of the carrier, upon actuation of lever 455 the carrier slides upwardly on squared sleeve 449 to withdraw the daubers from the reservoir and swing the carriage in the direction of the arrow in Fig. 27 and against the wrapper web (as shown in dotted lines in said figure) to thereby apply spaced dots of adhesive to the web.

Referring to Figs. 27, 30 and 31 bands or labels b are supplied from a magazine generally indicated at 472 and supported at the top of frame members 451 and 452. Bands are successively withdrawn from the bottom of the stack in the magazine by a suction head 473 provided on the upper end of a carrier 474. Carrier 474 which is similar in construction to carrier 447 previously described is provided with spaced side members 475 which are slotted at 476 to slidably engage (Fig. 31) spaced squared sleeves 477 rotatably mounted on cross shaft 450 at opposite ends of sleeve 449, the ends of sleeves 477 adjacent the ends of sleeve 449 being provided with guide flanges 478. The suction head is formed with a passage 479 opening to the face of the suction head and provided with a rubber gasket 480 which extends slightly beyond the face of the suction head and engages the lowermost band. Passage 479 communicates with a bore 481 which communicates through a branch pipe 482 with a main pipe line 483 in which suction is normally maintained by a suitable vacuum pump not shown. Bore 481 is formed with a relief opening 484 which is normally closed by a valve comprising a disc 485 carried at the end of a stem 486 slidably mounted in a head 487. A spring 488 urges disc 485 outward of the head, such movement being limited by a cross pin 490 in the end of the stem. The head 487 is pivoted at 491 to the carrier 474 and is urged toward valve closing position by a torsion spring 492.

The carrier 474 is provided with trunnions 493 pivotally mounted in trunnion bearings 494 formed in spaced arms 495 fixed to a rock shaft 496 rotatably mounted in frame members 450 and 452. An arm 497 also fixed to shaft 496 is connected by a link 498 to one end of an operating lever 499 (Fig. 29) pivoted at its opposite end on shaft 425. Lever 499 carries a cam roll 500 held in operative engagement, by a spring 489, with a cam 501 fixed on cam shaft 393. Actuation of lever 499 moves carrier 474 downwardly on squared sleeves 477 from the position shown in full lines in Fig. 30 to withdraw a band from the magazine and swing the carrier in the direction of the arrow and against the adhesively prepared portion of web p as shown in dotted line in the latter figure. Just slightly prior to the engagement of the wrapper web by the suction head a finger 502 carried by valve head 487 engages a lug 503 carried by rock shaft 496 to open the valve and break the suction in line 483.

Simultaneously with the engagement of the web by the suction head and the band carried thereby, the rear of the wrapper web is engaged by the central portion 504 of a heated platen 446, the band being pressed against the web between the platen portion 504 and the suction head to firmly press the band against the spots of adhesive previously applied to the web by the daubers 453. The platen is heated, by suitable electric heating units indicated at 505 in Fig. 27, for the purpose of rapidly drying or setting the adhesive.

As best shown in Fig. 27 platen 446 is carried by arms 506 extending from a block 507 slidably mounted on parallel cantilever rods 508 and 509 fixed in the machine frame. The block 507 is connected by a link 510 to one arm of a bell crank 511, the other arm of which is connected by a link 512 to an operating lever 513 pivoted at one end on shaft 425. Lever 513 carries a cam roll 514 held by a spring 515 in operative engagement with a cam 516, fixed to cam shaft 393, by which the platen is advanced into engagement with the web simultaneously with the application of the band as previously described.

Preferably short cuts are formed at the edge of the web adjacent opposite edges of the band to facilitate the use of the latter as a tearing strip in removal of the wrapper from the cigar. For this purpose the face of the platen at opposite sides of portion 504 is provided with short blades 520 adapted to pierce the wrapper web, as shown in Fig. 30, when the platen and suction head engage the web. The suction head is provided with recesses 521 to receive the blades.

It will be understood the adhesive applying member 444, the suction head 473, and platen 446 all operate during a single period of dwell of the wrapper during the idle moment of rack 366, and that the movement of the members overlap while performing their functions in the order described.

Referring to Figs. 30 and 31, the stack of bands is positioned between side rods 522 and spaced end members 523, the stack being supported at its ends by the edge portions of plates 524. To prevent a tendency of the weight of a full stack to prevent a band from being withdrawn from the stack, means are preferably provided to provide additional support for the upper portion of the stack during the time a band is being withdrawn. For this purpose flat narrow members 525, having hook-shaped upper ends 526 which engage over pins 527 carried at the upper ends of end members 523 are suspended between the latter. Members 525 extend, as shown in Fig. 31, to a point adjacent the bottom of the stack. Members 525 are periodically pressed inwardly against the upper portion of the stack by the ends 528 of small pistons having heads 529 operating in vacuum cylinders 530 supported by end members 523. The cylinders are connected by branch pipes 531 to the suction line 483, the suction overcoming springs 532 to move the pistons 528 against the members 525 to thereby support the upper portion of the stack while the suction head is withdrawing the lowermost band. When valve 487 is opened as previously described to break the vacuum in line 483 and its branches, the springs 532 withdraw the piston pins 528, thereby releasing the stack until suction is again established by closure of valve 487 as the suction head moves toward band receiving position.

Means are provided to render the above described adhesive and band applying means inactive when the web feeding cycle is interrupted by the failure of detector 414 to find a cigar in position to be wrapped in the succeeding wrapper. As shown in Figs. 28, 29, and 31 this means comprises latches 533, 534 and 535 fixed to a rock shaft 536 and respectively positioned to be swung beneath the free ends of operating levers 499, 459 and 513 when the latter are in their uppermost position. A collar 538 is fixed to one end of shaft 536 and is cut away to form an abutment 539. The hub of web feeding lever 394 is formed with an extension 540 which carries an adjustable screw 541 adapted, as lever 394 rises from the position of Fig. 29 to that of Fig. 28 to engage abutment 539 and rotate shaft 536 to swing the latches 533, 534, and 535 beneath the free ends of the respective levers 499, 459, and 513. If lever 394 is restrained from following its cam by latch 427, as previously described, the levers 499, 459, and 513 are similarly restrained by their respective latches. If lever 394 is not so restrained its downward movement withdraws screw 541 from engagement with abutment 539 and shaft 536 is returned to its initial position, by spring 542 connected between cycle lever 434 and a pin 543 set in shaft 536, to swing the latches carried thereby from beneath their corresponding levers. A pin 544, carried by bracket 545 in which one end of shaft 536 is supported, extends into a slot 546 formed in a collar 547 fixed to shaft 536 and limits the extent of rotation of said shaft under the influence of spring 542 and halts the abutment 539 in position to be engaged by screw 541.

As shown in Fig. 27 cam shaft 393 carries a bevel gear 550 which meshes with a bevel gear 551 secured to the end of main drive shaft 286 which powers the machine as a whole.

In summary it will be seen that the wrapping of the cigar is completed in the course of three cycles of operation of the machine as a whole, a wrapped cigar being discharged to the sealers at each cycle. The grippers 82 are simultaneously opened at the first and third stations to simultaneously respectively receive a cigar and to discharge a cigar. As a cigar enters the grippers the initial folding operation of draping the wrapper about three sides of the cigar takes place and as the cigar leaves the grippers the final wrapping step, namely, folding the downwardly extending tucked ends of the wrapper against the underside of the cigar is accomplished, the completely wrapped cigar being discharged in front of the aligned forward end of the horizontal pusher 228 to be moved thereby into and through the sealers. Just prior to the movement of the grippers from the first station, the rear underfold is made by plate 115 and in the movement of the grippers from the first station to the second or intermediate station the forward underfold is made by stationary plate 127 so that the cigar is completely encircled when it comes to rest at the intermediate station at which the extending ends of the wrappers are side tucked and folded downwardly for discharge from the grippers. The upward and downward movements of the cigar are relatively short and in the plane of forward movement of the cigar. This manner of handling the cigars together with the combination of the operation of the wrapping instrumentalities with the three cycles results in an extremely fast, smooth and quiet operation of the machine.

The wrapper feed is so cordinated with the wrapping instrumentalities that a wrapper web is held stationary during the first portion of each cycle and projected and cut off to form a wrapper during the last portion of the cycle. This part cycle of rest of the wrapper web is utilized for a novel preparation of the wrapper by applying a cigar band in a predetermined and adjustable position on the outer surface of the web. The operation of the web feeding and preparing means is made dependent on the presence of a cigar in the pocket of the first conveyor during the immediately preceding cycle by means of the detector 414 which in the absence of a cigar inhibits the next web preparation-feeding cycle, without interfering with the operation of the conveyor system and the wrapping instrumentalities.

What is claimed is:

1. In a machine for wrapping cigars and the like, an endless conveyor traveling in a vertical plane and provided with a plurality of pairs of cigar receiving grippers, means to drive said conveyor intermittently, means positioned at a station of rest of the conveyor to move a cigar and wrapper into a pair of said grippers to drape the wrapper about three sides of the cigar with the ends of the wrapper extending outwardly of the ends of the cigar, means to fold the rear edge portion of the wrapper against the bottom face of the cigar, means in the path of advance of the cigar to fold the forward edge portion of the wrapper to complete the encirclement of the cigar, two pairs of tucker blades mounted for pivotal movement in a horizontal plane and positioned one pair opposite each end of the cigar at the next rest station of the conveyor means to swing said blades to fold the sides of the end portions of the wrapper inwardly to form bellows folds, a pivoted top folder positioned above each pair of tucker blades, means to swing said top folders downwardly to fold the tucked ends of the wrapper over the ends of the cigars, clamps engaging the end portions of the cigar outwardly of the grippers during the operation of said tuckers and top folders, means to maintain said downwardly extending wrapper ends in position during movement of the conveyor to its next rest station, a forwardly directed pusher positioned below and reciprocable in the plane of the conveyor at said last station, means to transfer the partially wrapped cigar from the grippers to a position in front of said pusher, stationary means in the path of movement of the cigar from the grippers to its positon in front of the pusher to fold the downwardly extending wrapper ends against the underside of the cigar, and heat sealing means to receive the wrapped cigar upon forward reciprocation of the pusher.

2. In a machine for wrapping cigars, a supporting member and a pair of side tuckers each carried at one end of a lever, the opposite ends of said levers being linked to fixed points of the support, said levers being each pivotally connected adjacent the side tuckers to one arm of a bell crank, means for oscillating the bell cranks to move the tuckers toward and from each other in a common plane, an end folding member positioned above said end tuckers and pivoted for movement in a plane at right angles to the plane of movement of the tuckers and means to swing said end folding member downwardly between the tuckers as the latter are moved away from each other.

3. In a machine for wrapping cigars and the like, an endless conveyor traveling in a vertical plane and provided with a plurality of cigar supporting pockets, a second endless conveyor traveling in the same plane and provided with a plurality of pairs of cigar receiving grippers, the forward end of the first conveyor extending beneath the rear end of the second conveyor, a pusher member reciprocable in the plane of the conveyors and positioned forwardly of the first conveyor, wrapping means positioned intermediate the first conveyor and said pusher, means to intermittently move said conveyors to position successive pairs of grippers in alignment respectively with a pocket of the first conveyor, the wrapping means and the pusher at each cycle of operation of the conveyors, means operative during a portion of each said cycle to project the leading end of a wrapper web between said aligned pocket and grippers, and means operative during the remaining portion of each cycle to adhesively apply a cigar band in predetermined position on the outer surface of the wrapper web rearwardly of said projected end.

4. In a machine for wrapping cigars and the like, an endless conveyor traveling in a vertical plane and provided with a plurality of cigar supporting pockets, a second endless conveyor traveling in the same plane and provided with a plurality of pairs of cigar receiving grippers, the forward end of the first conveyor extending beneath the rear end of the second conveyor, a pusher member reciprocable in the plane of the conveyors and positioned forwardly of the first conveyor, wrapping means positioned intermediate the first conveyor and said pusher, means to intermittently move said conveyors to position successive pairs of grippers in alignment respectively with a pocket of the first conveyor, the wrapping means and the pusher at each cycle of operation of the conveyors, means operative during a portion of each said cycle to project the leading end of a wrapper web between said aligned pocket and grippers, means operative during the remaining portion of each cycle to adhesively apply a cigar band in predetermined position on the outer surface of the wrapper web rearwardly of said projected end, and means operative upon the absence of a cigar in the pocket immediately behind said aligned pocket to inhibit operation of the web feeding and band applying means during the succeeding cycle of conveyor operation.

5. In a machine for wrapping cigars and the like, spaced side frame members, an endless conveyor, provided with a plurality of cigar receiving grippers, supported by, and traveling in a vertical plane between, said side frame members, means at the rear end of said conveyor for feeding cigars and wrappers to said grippers, means at the forward end of said conveyor for discharging wrapped cigars from said grippers, opposed sub-frames mounted for vertical adjustment, one in each side frame, intermediate the ends of said conveyor, a common means for vertically adjusting each said sub-frame relative to the adjacent side frame member, opposed carriages one mounted on each said sub-frame for adjustment one toward the other, end tucking and folding means mounted on each carriage for movement therewith, means for independently adjusting said carriages relative to the sub-frames and means carried by the sub-frames for actuating said tucking and folding means in any position of adjustment of the carriages relative to the sub-frames.

6. In a wrapping machine as recited in claim 5 the end tucking means each comprising a pair of side tuckers each carried at one end of a lever, the opposite ends of said levers being linked to fixed points of the carriage, said levers being each pivotally connected adjacent the side tuckers to one arm of a bell crank, the fulcrums of the bell cranks extending downwardly through the carriage to position the second arm of the bell cranks below the carriage, said actuating means comprising a rock shaft carried by and extending between the sub-frames, arms carried by said shaft and linked to the said second arm of each bell crank and a single cam for rocking said rock shaft.

7. In a machine for wrapping cigars and the like, an endless conveyor traveling in a vertical plane and provided with a plurality of cigar supporting pockets, a second endless conveyor traveling in the same plane and provided with a plurality of pairs of cigar receiving grippers, the forward end of the first conveyor extending beneath the rear end of the second conveyor, a forwardly directed pusher member, reciprocable in the plane of the conveyors, positioned beneath the forward end of the second conveyor, wrapper end tucking and folding units positioned on opposite sides of the second conveyor intermediate the end of the first conveyor and said pusher, means to intermittently move said conveyors and retract said pusher to simultaneously bring said conveyors and said pusher to rest with adjacent pairs of grippers respectively positioned in vertical alignment with a cigar supporting pocket, between said end tucking and folding units and above and forwardly of said pusher, means to project a wrapper between said pocket and the adjacent aligned pair of grippers, means to simultaneously open the pair of grippers aligned with the pocket and the pair of grippers positioned above and forwardly of the pusher, means to transfer a cigar from the aligned pocket to the adjacent aligned and open pair of grippers to drape the wrapper about three sides of the cigar, and means to simultaneously transfer a cigar from the second pair of opened grippers to a position in front of the retracted pusher, the said wrapper end tucking and folding unit including means to fold the sides of the end portion of the wrapper inwardly to form bellows folds, means to fold the bellows folded end portions downwardly over the ends of the cigars and means, in the path of movement of the cigar from said second pair of open grippers to a position in front of the pusher, to lay said downwardly folded end portions against the underside of the cigar.

References Cited in the file of this patent

UNITED STATES PATENTS

| | | |
|---|---|---|
| 1,313,863 | Smith et al. | Aug. 19, 1919 |
| 1,965,321 | Smith | July 3, 1934 |
| 1,975,913 | Wheeler | Oct. 9, 1934 |
| 2,050,714 | Malocsay | Aug. 11, 1936 |
| 2,050,716 | Malocsay | Aug. 11, 1936 |
| 2,077,431 | Neumair | Apr. 20, 1937 |
| 2,208,776 | Sandberg | July 23, 1940 |
| 2,335,033 | Tompkins | Nov. 23, 1943 |
| 2,528,856 | Caldwell | Nov. 7, 1950 |